US012595194B2

(12) United States Patent
Dukes et al.

(10) Patent No.: US 12,595,194 B2
(45) Date of Patent: Apr. 7, 2026

(54) ACCELERATED SETTLEMENT OF FLOCS AFTER ELECTROCOAGULATION/ELECTROCHEMICAL PROCESS USING BALLASTED FLOCCULATION

(71) Applicant: Evoqua Water Technologies LLC, Pittsburgh, PA (US)

(72) Inventors: Simon Dukes, Chelmsford, MA (US); Hao Dang, Medford, MA (US); Wenxin Du, Dover, NH (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 935 days.

(21) Appl. No.: 17/775,308

(22) PCT Filed: Nov. 6, 2020

(86) PCT No.: PCT/US2020/059270
§ 371 (c)(1),
(2) Date: May 8, 2022

(87) PCT Pub. No.: WO2021/092277
PCT Pub. Date: May 14, 2021

(65) Prior Publication Data
US 2022/0388874 A1 Dec. 8, 2022

Related U.S. Application Data

(60) Provisional application No. 62/932,871, filed on Nov. 8, 2019.

(51) Int. Cl.
*C02F 1/463* (2023.01)
*C02F 1/00* (2023.01)
(Continued)

(52) U.S. Cl.
CPC .............. *C02F 1/463* (2013.01); *C02F 1/004* (2013.01); *C02F 1/44* (2013.01); *C02F 1/46104* (2013.01);
(Continued)

(58) Field of Classification Search
CPC .. C02F 1/463; C02F 1/004; C02F 1/44; C02F 1/46104; C02F 1/488; C02F 2101/20;
(Continued)

(56) References Cited

U.S. PATENT DOCUMENTS 438,579 A 10/1890 Faunce et al.
531,183 A 12/1894 Harris
(Continued)

FOREIGN PATENT DOCUMENTS

CN 1686862 A 10/2005
CN 200970548 Y 11/2007
(Continued)

OTHER PUBLICATIONS

Yang, Qi, "Decision of Rejection", Chinese Patent Application No. 202080077424.1, mailed Sep. 4, 2024, 14 pages.
(Continued)

*Primary Examiner* — Bryan D. Ripa

(57) ABSTRACT

A water treatment system comprises a source of water including one or more contaminants, an electrocoagulation cell including a housing defining a fluid flow conduit, an anode disposed within the fluid flow conduit, and a cathode disposed within the fluid flow conduit, the housing including an inlet fluidly connectable to the source of water and an outlet, a solids/liquid separation system having an inlet fluidly connectable to the outlet of the housing of the electrocoagulation cell, a solids-rich outlet, and a solids-lean outlet, and a ballast feed system configured to deliver a ballast to the solids/liquid separation system.

19 Claims, 9 Drawing Sheets

(51) Int. Cl.

| | |
|---|---|
| *C02F 1/44* | (2023.01) |
| *C02F 1/461* | (2023.01) |
| *C02F 1/48* | (2023.01) |
| *C02F 101/20* | (2006.01) |
| *C02F 101/32* | (2006.01) |

(52) U.S. Cl.
CPC .......... *C02F 1/488* (2013.01); *C02F 2101/20* (2013.01); *C02F 2101/32* (2013.01); *C02F 2201/4614* (2013.01); *C02F 2201/46145* (2013.01); *C02F 2209/04* (2013.01); *C02F 2209/05* (2013.01); *C02F 2209/11* (2013.01); *C02F 2303/18* (2013.01); *C02F 2305/12* (2013.01)

(58) Field of Classification Search
CPC .......... C02F 2101/32; C02F 2201/4614; C02F 2201/46145; C02F 2209/04; C02F 2209/05; C02F 2209/11; C02F 2303/18; C02F 2305/12; C02F 2101/14; C02F 2101/22; C02F 2101/325; C02F 2103/10; C02F 2103/365; C02F 2209/001; C02F 2209/003; C02F 2209/008; C02F 1/001; C02F 1/42; C02F 1/441; C02F 2209/005; C02F 2209/40; C02F 2301/046; C02F 2303/24; B03C 1/32; B03D 3/02
See application file for complete search history.

(56) References Cited

U.S. PATENT DOCUMENTS

| | | | |
|---|---|---|---|
| 653,010 | A | 7/1900 | Koyl |
| 728,062 | A | 5/1903 | Wilson |
| 1,064,807 | A | 6/1913 | Yost |
| 1,310,461 | A | 7/1919 | Williams |
| 1,383,287 | A | 7/1921 | Campbell |
| 1,401,288 | A | 12/1921 | Sodeau |
| 1,948,080 | A | 2/1934 | Thomas |
| 2,065,123 | A | 12/1936 | Downes |
| 2,129,267 | A | 9/1938 | Fischer |
| 2,232,294 | A | 2/1941 | Urbain et al. |
| 2,232,296 | A | 2/1941 | Urbain et al. |
| 2,268,461 | A | 12/1941 | Nichols |
| 2,285,697 | A | 6/1942 | Durdin |
| 2,326,575 | A | 8/1943 | Stearns |
| 2,359,748 | A | 10/1944 | Clemens |
| 2,391,494 | A | 12/1945 | Walker |
| 2,401,924 | A | 6/1946 | Goetz |
| 2,564,515 | A | 8/1951 | Vogel |
| 2,565,089 | A | 8/1951 | Prince |
| 2,597,561 | A | 5/1952 | Blind |
| 2,652,925 | A | 9/1953 | Vermeiren |
| 2,713,028 | A | 7/1955 | Jenks |
| 2,758,715 | A | 8/1956 | Fowler |
| 2,825,464 | A | 3/1958 | Mack |
| 2,912,107 | A | 11/1959 | Palm |
| 2,945,590 | A | 7/1960 | Stearns |
| 2,952,361 | A | 9/1960 | Newton |
| 3,066,095 | A | 11/1962 | Hronas |
| 3,080,264 | A | 3/1963 | Zimmie |
| 3,142,638 | A | 7/1964 | Blaisdell et al. |
| 3,228,878 | A | 1/1966 | Moody |
| 3,350,302 | A | 10/1967 | Demeter et al. |
| 3,575,852 | A | 4/1971 | Hughes |
| 3,617,561 | A | 11/1971 | Fanselow |
| 3,622,461 | A | 11/1971 | Wagner et al. |
| 3,627,678 | A | 12/1971 | Marston et al. |
| 3,676,337 | A | 7/1972 | Kolm |
| 3,690,454 | A | 9/1972 | Bekhtle et al. |
| 3,693,795 | A | 9/1972 | Robinson et al. |
| 3,697,420 | A | 10/1972 | Blaisdell et al. |
| 3,703,958 | A | 11/1972 | Kolm |
| 3,767,351 | A | 10/1973 | Blaser |
| 3,819,589 | A | 6/1974 | Fauke et al. |
| 3,856,666 | A | 12/1974 | Yashima et al. |
| 3,886,064 | A | 5/1975 | Kosonen |
| 3,887,457 | A | 6/1975 | Marston et al. |
| 3,920,543 | A | 11/1975 | Marston et al. |
| 3,929,632 | A | 12/1975 | Buriks et al. |
| 3,929,635 | A | 12/1975 | Buriks et al. |
| 3,950,319 | A | 4/1976 | Schmidt et al. |
| 3,951,807 | A | 4/1976 | Sanderson |
| 3,959,133 | A | 5/1976 | Fulton |
| 3,983,033 | A | 9/1976 | de Latour |
| 4,024,040 | A | 5/1977 | Phalangas et al. |
| 4,025,432 | A | 5/1977 | Nolan et al. |
| 4,033,864 | A | 7/1977 | Nolan et al. |
| 4,046,681 | A | 9/1977 | Marston et al. |
| 4,066,991 | A | 1/1978 | Marston et al. |
| 4,089,779 | A | 5/1978 | Neal |
| 4,110,208 | A | 8/1978 | Neal |
| 4,139,456 | A | 2/1979 | Yabuuchi et al. |
| 4,142,970 | A | 3/1979 | von Hagel et al. |
| 4,151,090 | A | 4/1979 | Brigante |
| 4,153,559 | A | 5/1979 | Sanderson |
| 4,167,480 | A | 9/1979 | Mach |
| 4,176,042 | A | 11/1979 | Fahlstrom |
| 4,190,539 | A | 2/1980 | Besik |
| 4,193,866 | A | 3/1980 | Slusarczuk et al. |
| 4,204,948 | A | 5/1980 | Wechsler et al. |
| 4,274,968 | A | 6/1981 | Grutsch et al. |
| 4,290,898 | A | 9/1981 | von Hagel et al. |
| 4,293,410 | A | 10/1981 | Streuli et al. |
| 4,297,484 | A | 10/1981 | Quinlan |
| 4,320,012 | A | 3/1982 | Palm et al. |
| 4,339,347 | A | 7/1982 | Quinlan |
| 4,341,657 | A | 7/1982 | Quinlan |
| 4,343,730 | A | 8/1982 | Becker et al. |
| 4,357,237 | A | 11/1982 | Sanderson |
| 4,358,382 | A | 11/1982 | Quinlan |
| 4,359,382 | A | 11/1982 | Morgan |
| 4,377,483 | A | 3/1983 | Yamashita et al. |
| 4,388,195 | A | 6/1983 | von Hagel et al. |
| 4,402,833 | A | 9/1983 | Bennett et al. |
| 4,440,649 | A | 4/1984 | Loftin et al. |
| 4,454,047 | A | 6/1984 | Becker et al. |
| 4,465,597 | A | 8/1984 | Herman et al. |
| 4,482,459 | A | 11/1984 | Shiver |
| 4,502,958 | A | 3/1985 | Sasaki |
| 4,522,643 | A | 6/1985 | Quinlan |
| 4,563,286 | A | 1/1986 | Johnson et al. |
| 4,579,655 | A | 4/1986 | Louboutin et al. |
| 4,588,508 | A | 5/1986 | Allenson et al. |
| 4,595,506 | A | 6/1986 | Kneer |
| 4,595,509 | A | 6/1986 | Fox et al. |
| 4,626,354 | A | 12/1986 | Hoffman et al. |
| 4,654,139 | A | 3/1987 | Baba et al. |
| 4,655,933 | A | 4/1987 | Johnson et al. |
| 4,686,035 | A | 8/1987 | Estabrook |
| 4,689,154 | A | 8/1987 | Zimberg |
| 4,699,951 | A | 10/1987 | Allenson et al. |
| 4,735,725 | A | 4/1988 | Reischl et al. |
| 4,752,401 | A | 6/1988 | Bodenstein |
| 4,765,900 | A | 8/1988 | Schwoyer et al. |
| 4,765,908 | A | 8/1988 | Monick et al. |
| 4,783,265 | A | 11/1988 | Timmons |
| 4,795,557 | A | 1/1989 | Bourbigot et al. |
| 4,827,890 | A | 5/1989 | Pociask et al. |
| 4,843,105 | A | 6/1989 | Reischl et al. |
| 4,849,128 | A | 7/1989 | Timmons et al. |
| 4,851,123 | A | 7/1989 | Mishra |
| 4,864,075 | A | 9/1989 | Thompson et al. |
| 4,872,993 | A | 10/1989 | Harrison |
| 4,874,508 | A | 10/1989 | Fritz |
| 4,882,064 | A | 11/1989 | Dixon et al. |
| 4,921,597 | A | 5/1990 | Lurie |
| 4,921,613 | A | 5/1990 | Nordberg et al. |
| 4,927,543 | A | 5/1990 | Bablon et al. |
| 4,938,876 | A | 7/1990 | Ohsol |
| 4,940,550 | A | 7/1990 | Watson |
| 4,944,278 | A | 7/1990 | Woodard |
| 4,944,279 | A | 7/1990 | Woodard |

(56) References Cited

U.S. PATENT DOCUMENTS

| | | | |
|---|---|---|---|
| 4,956,099 | A | 9/1990 | Thompson et al. |
| 4,981,593 | A | 1/1991 | Priestley et al. |
| 5,009,791 | A | 4/1991 | Lin et al. |
| 5,013,451 | A | 5/1991 | Thompson et al. |
| 5,019,274 | A | 5/1991 | Thompson et al. |
| 5,023,012 | A | 6/1991 | Buchan et al. |
| 5,026,483 | A | 6/1991 | Thompson et al. |
| 5,055,194 | A | 10/1991 | Goetz et al. |
| 5,064,531 | A | 11/1991 | Wang et al. |
| 5,069,783 | A | 12/1991 | Wang et al. |
| 5,084,733 | A | 1/1992 | Katoh et al. |
| 5,089,120 | A | 2/1992 | Eberhardt |
| 5,089,227 | A | 2/1992 | Thompson et al. |
| 5,089,619 | A | 2/1992 | Thompson et al. |
| 5,112,494 | A | 5/1992 | Yan |
| 5,112,499 | A | 5/1992 | Murray et al. |
| 5,126,050 | A | 6/1992 | Irvine et al. |
| 5,149,438 | A | 9/1992 | Hebert |
| 5,187,326 | A | 2/1993 | Shirai |
| 5,234,603 | A | 8/1993 | Potts |
| 5,266,200 | A | 11/1993 | Reid |
| 5,298,168 | A | 3/1994 | Guess |
| 5,307,938 | A | 5/1994 | Lillmars |
| 5,310,642 | A | 5/1994 | Vargas et al. |
| 5,369,072 | A | 11/1994 | Benjamin et al. |
| 5,377,845 | A | 1/1995 | Hamen et al. |
| 5,383,539 | A | 1/1995 | Bair et al. |
| 5,395,527 | A | 3/1995 | Desjardins |
| 5,397,476 | A | 3/1995 | Bradbury et al. |
| 5,462,670 | A | 10/1995 | Guess |
| 5,545,330 | A | 8/1996 | Ehrlich |
| 5,560,493 | A | 10/1996 | Perry |
| 5,593,590 | A | 1/1997 | Steyskal |
| 5,595,666 | A | 1/1997 | Kochen et al. |
| 5,596,392 | A | 1/1997 | Danzuka |
| 5,597,479 | A | 1/1997 | Johnson |
| 5,616,241 | A | 4/1997 | Khudenko |
| 5,616,250 | A | 4/1997 | Johnson et al. |
| 5,637,221 | A | 6/1997 | Coyne |
| 5,693,461 | A | 12/1997 | Bagchi et al. |
| 5,702,809 | A | 12/1997 | Tixier et al. |
| 5,730,864 | A | 3/1998 | Delsalle et al. |
| 5,731,134 | A | 3/1998 | Honan et al. |
| 5,766,459 | A | 6/1998 | Adams, Jr. |
| 5,770,091 | A | 6/1998 | Binot et al. |
| 5,779,908 | A | 7/1998 | Anderson et al. |
| 5,800,717 | A | 9/1998 | Ramsay et al. |
| 5,805,965 | A | 9/1998 | Tsuda et al. |
| 5,840,195 | A | 11/1998 | Delsalle et al. |
| 5,856,072 | A | 1/1999 | Leone et al. |
| 5,893,355 | A | 4/1999 | Glover et al. |
| 5,925,290 | A | 7/1999 | Hills |
| 5,976,375 | A | 11/1999 | Dorica et al. |
| 5,976,771 | A | 11/1999 | Kosugi et al. |
| 6,010,631 | A | 1/2000 | Delsalle et al. |
| 6,030,761 | A | 2/2000 | Taguchi et al. |
| 6,093,318 | A | 7/2000 | Saho et al. |
| 6,099,738 | A | 8/2000 | Wechsler et al. |
| 6,149,014 | A | 11/2000 | Mankosa et al. |
| 6,151,467 | A | 11/2000 | Yamaguchi |
| 6,160,976 | A | 12/2000 | Karakama et al. |
| 6,185,393 | B1 | 2/2001 | Karakama et al. |
| 6,210,587 | B1 | 4/2001 | Vion |
| 6,210,588 | B1 | 4/2001 | Vion |
| 6,217,773 | B1 | 4/2001 | Graham |
| 6,221,253 | B1 | 4/2001 | Fukase et al. |
| 6,221,262 | B1 | 4/2001 | MacDonald et al. |
| 6,228,269 | B1 | 5/2001 | Cort |
| 6,228,565 | B1 | 5/2001 | Ohzeki et al. |
| 6,251,576 | B1 | 6/2001 | Taguchi et al. |
| 6,277,285 | B1 | 8/2001 | Vion |
| 6,290,849 | B1 | 9/2001 | Rykaer et al. |
| 6,379,549 | B1 | 4/2002 | LePoder et al. |
| 6,383,370 | B1 | 5/2002 | Keever et al. |
| 6,386,781 | B1 | 5/2002 | Gueret |
| 6,406,624 | B1 | 6/2002 | DeVos |
| 6,423,485 | B1 | 7/2002 | Yamada et al. |
| 6,432,303 | B1 | 8/2002 | Chesner et al. |
| 6,447,686 | B1 | 9/2002 | Choi et al. |
| 6,472,132 | B1 | 10/2002 | Yamada et al. |
| 6,478,955 | B1 | 11/2002 | Saho et al. |
| 6,485,652 | B1 | 11/2002 | Le Poder et al. |
| 6,517,714 | B2 | 2/2003 | Streat |
| 6,558,550 | B1 * | 5/2003 | Kelly ........................ C02F 9/00 |
| | | | 210/615 |
| 6,576,145 | B2 | 6/2003 | Conaway et al. |
| 6,613,232 | B2 | 9/2003 | Chesner et al. |
| 6,645,386 | B1 | 11/2003 | Moreau et al. |
| 6,689,277 | B2 | 2/2004 | Streat |
| 6,692,173 | B2 | 2/2004 | Gueret |
| 6,706,467 | B2 | 3/2004 | Howe et al. |
| 6,740,245 | B2 | 5/2004 | Johnson |
| 6,759,018 | B1 | 7/2004 | Arno et al. |
| 6,783,679 | B1 | 8/2004 | Rozich |
| 6,811,885 | B1 | 11/2004 | Andriessen et al. |
| 6,824,692 | B2 | 11/2004 | Binot et al. |
| 6,832,691 | B2 | 12/2004 | Miles et al. |
| 6,875,351 | B2 | 4/2005 | Arnaud |
| 6,878,856 | B2 | 4/2005 | Kim et al. |
| 6,896,815 | B2 | 5/2005 | Cort |
| 6,902,678 | B2 | 6/2005 | Tipton |
| 6,919,031 | B2 | 7/2005 | Blumenschein et al. |
| 6,923,901 | B2 | 8/2005 | Effler et al. |
| 6,960,294 | B2 | 11/2005 | Arnaud |
| 6,966,993 | B2 | 11/2005 | Binot |
| 6,968,138 | B2 | 11/2005 | Akutsu |
| 7,001,525 | B2 | 2/2006 | Binot et al. |
| 7,083,715 | B2 | 8/2006 | Binot |
| 7,153,431 | B2 | 12/2006 | Daugherty |
| 7,160,448 | B2 | 1/2007 | Johnson |
| 7,210,581 | B2 | 5/2007 | Robinson et al. |
| 7,244,362 | B2 | 7/2007 | Binot |
| 7,255,793 | B2 | 8/2007 | Cort |
| 7,276,165 | B2 | 10/2007 | Morgoun |
| 7,309,435 | B2 | 12/2007 | Rozich |
| 7,311,841 | B2 | 12/2007 | Binot et al. |
| 7,323,108 | B1 | 1/2008 | Garbett et al. |
| 7,407,582 | B2 | 8/2008 | Sun |
| 7,407,593 | B2 | 8/2008 | Frederick, Jr. et al. |
| 7,438,817 | B2 | 10/2008 | Nagghappan et al. |
| 7,449,105 | B2 | 11/2008 | Hastings |
| 7,476,324 | B2 | 1/2009 | Ciampi et al. |
| 7,494,592 | B2 | 2/2009 | Deskins |
| 7,563,366 | B2 | 7/2009 | Sun |
| 7,601,261 | B2 | 10/2009 | Donaque |
| 7,608,190 | B1 | 10/2009 | Banerjee et al. |
| 7,625,490 | B2 | 12/2009 | Cort |
| 7,648,637 | B1 | 1/2010 | Sauvignet et al. |
| 7,648,638 | B2 | 1/2010 | Essemiani et al. |
| 7,651,620 | B2 | 1/2010 | Vion |
| 7,678,278 | B2 | 3/2010 | Binot et al. |
| 7,686,079 | B2 | 3/2010 | Gamache et al. |
| 7,686,960 | B2 | 3/2010 | Cort |
| 7,691,261 | B2 | 4/2010 | Deskins |
| 7,691,269 | B2 | 4/2010 | Cort |
| 7,695,623 | B2 | 4/2010 | Woodard et al. |
| 7,695,630 | B2 | 4/2010 | de Guevara |
| 7,704,390 | B2 | 4/2010 | Leffler et al. |
| 7,704,399 | B2 | 4/2010 | Condit |
| 7,722,843 | B1 | 5/2010 | Srinivasachar |
| 7,729,778 | B2 | 6/2010 | Eggers et al. |
| 7,820,025 | B2 | 10/2010 | Ciampi et al. |
| 7,820,053 | B2 | 10/2010 | Cort |
| 7,820,054 | B2 | 10/2010 | Hastings et al. |
| 7,828,976 | B2 | 11/2010 | Banerjee et al. |
| 8,012,582 | B2 | 9/2011 | Luo et al. |
| 8,056,728 | B2 | 11/2011 | Riise et al. |
| 8,470,172 | B2 | 6/2013 | Woodard et al. |
| 8,506,800 | B2 | 8/2013 | Woodard et al. |
| 8,540,877 | B2 | 9/2013 | Woodard |
| 12,054,407 | B1 * | 8/2024 | Waller .................... C02F 1/488 |
| 2001/0030160 | A1 | 10/2001 | Wechsler et al. |
| 2002/0003115 | A1 | 1/2002 | Conaway et al. |
| 2002/0017483 | A1 | 2/2002 | Chesner et al. |

(56) References Cited

U.S. PATENT DOCUMENTS

| | | | |
|---|---|---|---|
| 2002/0030019 A1 | 3/2002 | Keever et al. |
| 2002/0054783 A1 | 5/2002 | Gueret |
| 2002/0088758 A1 | 7/2002 | Blumenschein et al. |
| 2002/0148780 A1 | 10/2002 | Tiemeyer |
| 2002/0158025 A1 | 10/2002 | Streat |
| 2002/0170816 A1 | 11/2002 | Leffler et al. |
| 2002/0185452 A1 | 12/2002 | Johnson |
| 2002/0190004 A1 | 12/2002 | Wechsler et al. |
| 2003/0082084 A1 | 5/2003 | Cort |
| 2003/0089667 A1 | 5/2003 | Binot et al. |
| 2003/0132160 A1 | 7/2003 | Khudenko |
| 2003/0150817 A1 | 8/2003 | Keever et al. |
| 2003/0222027 A1 | 12/2003 | Streat |
| 2003/0224301 A1 | 12/2003 | Howe et al. |
| 2004/0055959 A1 | 3/2004 | Wechsler et al. |
| 2004/0055961 A1 | 3/2004 | Binot |
| 2004/0060876 A1 | 4/2004 | Tipton |
| 2004/0129642 A1 | 7/2004 | Binot |
| 2004/0144730 A1 | 7/2004 | Binot et al. |
| 2004/0149653 A1 | 8/2004 | Johnson et al. |
| 2004/0206680 A1 | 10/2004 | Johnson |
| 2004/0206699 A1 | 10/2004 | Ho et al. |
| 2004/0213721 A1 | 10/2004 | Arno et al. |
| 2005/0005471 A1 | 1/2005 | Pan |
| 2005/0035030 A1 | 2/2005 | Oder et al. |
| 2005/0045534 A1 | 3/2005 | Kin et al. |
| 2005/0051488 A1 | 3/2005 | Nagghappan et al. |
| 2005/0101719 A1 | 5/2005 | Ishihara |
| 2005/0103719 A1 | 5/2005 | Binot et al. |
| 2005/0131266 A1 | 6/2005 | Carman et al. |
| 2005/0173354 A1 | 8/2005 | Binot et al. |
| 2005/0194311 A1 | 9/2005 | Rozich |
| 2005/0218056 A1 | 10/2005 | Binot |
| 2005/0230299 A1 | 10/2005 | Saho et al. |
| 2005/0258103 A1 | 11/2005 | Cort |
| 2005/0271575 A1 | 12/2005 | Ciampi et al. |
| 2005/0277712 A1 | 12/2005 | Daly |
| 2005/0282144 A1 | 12/2005 | Wechsler et al. |
| 2006/0006114 A1 | 1/2006 | Deskins |
| 2006/0018273 A1 | 1/2006 | Yamada et al. |
| 2006/0108273 A1 * | 5/2006 | Perri ................ B01D 21/0045 |
| | | | 210/275 |
| 2006/0108283 A1 | 5/2006 | Johnson et al. |
| 2006/0138047 A1 | 6/2006 | Morgoun |
| 2006/0175252 A1 | 8/2006 | Upendrakumar et al. |
| 2006/0186056 A1 | 8/2006 | Ivan |
| 2006/0213832 A1 | 9/2006 | Hudson et al. |
| 2006/0254770 A1 | 11/2006 | Hou |
| 2006/0270888 A1 | 11/2006 | Carman et al. |
| 2006/0289357 A1 | 12/2006 | Wechsler et al. |
| 2007/0039894 A1 | 2/2007 | Cort |
| 2007/0062883 A1 | 3/2007 | Frederick et al. |
| 2007/0108132 A1 | 5/2007 | de Guevara |
| 2007/0114184 A1 | 5/2007 | Essemiani et al. |
| 2007/0119776 A1 | 5/2007 | Isaka et al. |
| 2007/0138093 A1 | 6/2007 | Bossler et al. |
| 2007/0163955 A1 | 7/2007 | Sun |
| 2008/0019780 A1 | 1/2008 | Hastings |
| 2008/0073267 A1 | 3/2008 | Cort |
| 2008/0073268 A1 | 3/2008 | Cort |
| 2008/0073270 A1 | 3/2008 | Smith |
| 2008/0073271 A1 | 3/2008 | Cort |
| 2008/0073278 A1 | 3/2008 | Cort |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |
| 2008/0078721 A1 | 4/2008 | Binot et al. |
| 2008/0135491 A1 | 6/2008 | Cort |
| 2008/0150518 A1 | 6/2008 | Becker et al. |
| 2008/0156709 A1 | 7/2008 | Johnson |
| 2008/0164183 A1 | 7/2008 | Marston et al. |
| 2008/0164184 A1 | 7/2008 | Marston et al. |
| 2008/0203015 A1 | 8/2008 | Marston et al. |
| 2008/0210613 A1 | 9/2008 | Wechsler et al. |
| 2008/0217244 A1 | 9/2008 | Gaid |
| 2008/0257810 A1 | 10/2008 | Sun |
| 2008/0272065 A1 | 11/2008 | Johnson |
| 2008/0290030 A1 | 11/2008 | Nagghappan et al. |
| 2008/0296228 A1 | 12/2008 | Sauvignet et al. |
| 2008/0314820 A1 | 12/2008 | Prulhiere et al. |
| 2008/0314830 A1 | 12/2008 | Banerjee et al. |
| 2009/0047076 A1 | 2/2009 | Hastings |
| 2009/0050570 A1 | 2/2009 | Sauvignet |
| 2009/0065404 A1 | 3/2009 | Paspek, Jr. et al. |
| 2009/0084730 A1 | 4/2009 | Mabille et al. |
| 2009/0098262 A1 | 4/2009 | Mabille et al. |
| 2009/0127180 A1 | 5/2009 | Deskins |
| 2009/0178979 A1 | 7/2009 | Hastings et al. |
| 2009/0189599 A1 | 7/2009 | Fujii et al. |
| 2009/0206040 A1 | 8/2009 | Berg et al. |
| 2009/0218281 A1 | 9/2009 | Sauvignet et al. |
| 2009/0261037 A1 | 10/2009 | Clifford, III et al. |
| 2009/0272693 A1 | 11/2009 | Mabille et al. |
| 2009/0299143 A1 | 12/2009 | Conlon et al. |
| 2009/0301948 A1 | 12/2009 | Essemiani et al. |
| 2009/0308815 A1 | 12/2009 | Sauvignet et al. |
| 2010/0038081 A1 | 2/2010 | Gamache et al. |
| 2010/0047671 A1 | 2/2010 | Chiang et al. |
| 2010/0057085 A1 | 3/2010 | Holcomb et al. |
| 2010/0072142 A1 | 3/2010 | Lean et al. |
| 2010/0096335 A1 | 4/2010 | Sauvignet et al. |
| 2010/0101309 A1 | 4/2010 | Klyamkin et al. |
| 2010/0102006 A1 | 4/2010 | Quevillon |
| 2010/0155327 A1 | 6/2010 | Woodard et al. |
| 2010/0213123 A1 | 8/2010 | Marston et al. |
| 2010/0219372 A1 | 9/2010 | Hook et al. |
| 2010/0224497 A1 * | 9/2010 | Livshits ............... C02F 1/4678 |
| | | | 205/750 |
| 2010/0251571 A1 | 10/2010 | Woodard |
| 2010/0274209 A1 | 10/2010 | Roe et al. |
| 2011/0036771 A1 | 2/2011 | Woodard |
| 2011/0147304 A1 | 6/2011 | Sauvignet et al. |
| 2012/0067824 A1 | 3/2012 | Berg et al. |
| 2013/0020255 A1 | 1/2013 | Woodard |
| 2013/0333151 A1 | 12/2013 | Nishizawa |
| 2015/0210574 A1 | 7/2015 | Antonneau et al. |
| 2016/0009583 A1 * | 1/2016 | Poirier ..................... C02F 1/76 |
| | | | 205/756 |
| 2019/0194048 A1 | 6/2019 | Wikramanayake et al. |
| 2020/0255308 A1 * | 8/2020 | Hoeferlin ............... C02F 1/283 |
| 2021/0230018 A1 * | 7/2021 | Jaffrey ................. B01D 1/0076 |

FOREIGN PATENT DOCUMENTS

| | | | |
|---|---|---|---|
| CN | 101186410 A | 5/2008 |
| CN | 101244884 A | 8/2008 |
| CN | 101296870 A | 10/2008 |
| CN | 101309870 A | 11/2008 |
| CN | 202238297 U | 5/2012 |
| CN | 105084633 A | 11/2015 |
| DE | 973611 C | 4/1960 |
| DE | 3513800 A1 | 10/1986 |
| DE | 4207335 A1 | 9/1993 |
| DE | 19600647 A1 | 7/1997 |
| EP | 12594 A1 | 6/1980 |
| EP | 0087223 A1 | 8/1983 |
| EP | 0139572 A1 | 5/1985 |
| EP | 266098 A2 | 5/1988 |
| EP | 392321 A1 | 10/1990 |
| EP | 392322 A1 | 10/1990 |
| EP | 1244601 B1 | 10/2002 |
| EP | 1785400 A1 | 5/2007 |
| EP | 1866255 A2 | 12/2007 |
| EP | 2104649 A1 | 9/2009 |
| EP | 2165980 A1 | 3/2010 |
| FR | 1411792 A | 9/1965 |
| FR | 2378550 A1 | 8/1978 |
| FR | 2719235 A1 | 11/1995 |
| GB | 910476 A | 11/1962 |
| GB | 1475933 A | 6/1977 |
| GB | 2548491 A | 9/2017 |

(56) References Cited

FOREIGN PATENT DOCUMENTS

| JP | 07-299495 A | 11/1995 |
| JP | 08-257583 A | 10/1996 |
| JP | 11-169866 A | 6/1999 |
| JP | 2000-233198 A | 8/2000 |
| JP | 2001-170404 A | 6/2001 |
| JP | 2003-010874 A | 1/2003 |
| KR | 100479646 B1 | 3/2005 |
| SU | 1136839 A1 | 1/1985 |
| WO | 199312041 A1 | 6/1993 |
| WO | 1997035654 A1 | 10/1997 |
| WO | 1997035655 A1 | 10/1997 |
| WO | 1998003433 A1 | 1/1998 |
| WO | 199919261 A1 | 4/1999 |
| WO | 199931016 A1 | 6/1999 |
| WO | 200114260 A1 | 3/2001 |
| WO | 200128931 A1 | 4/2001 |
| WO | 2001040121 A1 | 6/2001 |
| WO | 200200556 A1 | 1/2002 |
| WO | 2002042223 A1 | 5/2002 |
| WO | 2005077835 A1 | 8/2005 |
| WO | 2005087381 A1 | 9/2005 |
| WO | 200608634 A2 | 8/2006 |
| WO | 2006102362 A2 | 9/2006 |
| WO | 2007059141 A2 | 5/2007 |
| WO | 2007098298 A2 | 8/2007 |
| WO | 2007103409 A2 | 9/2007 |
| WO | 2008022192 A2 | 2/2008 |
| WO | 2008039711 A2 | 4/2008 |
| WO | 2008039936 A2 | 4/2008 |
| WO | 2008085196 A2 | 7/2008 |
| WO | 2008085197 A1 | 7/2008 |
| WO | 2008086009 A1 | 7/2008 |
| WO | 2008086010 A1 | 7/2008 |
| WO | 2009083346 A1 | 7/2009 |
| WO | 2010027895 A2 | 3/2010 |
| WO | 2010081903 A1 | 7/2010 |
| WO | 2010086249 A1 | 8/2010 |
| WO | 2011005927 A1 | 1/2011 |
| WO | 2011031305 A1 | 3/2011 |
| WO | 2012086475 A1 | 6/2012 |
| WO | 2013/187979 A1 | 12/2013 |
| WO | 2014065859 A1 | 5/2014 |
| WO | 2014153570 A2 | 9/2014 |

OTHER PUBLICATIONS

Ting, Liao, "First Office Action", Chinese Patent Application No. 202080077424.1, mailed Sep. 27, 2023, 18 pages.

Eli-Ghafari, Rasha, "Requisition by The Examiner", Canadian Patent Application No. 3156422, mailed Jun. 13, 2025.

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

Catlow et al. "Ballasted Biological Treatment Process Removes Nutrients and Doubles Plant Capacity". WEFTEC Conference (Oct. 2008).

Chinese First Office Action dated Aug. 16, 2013 for Application No. 201180021491.2.

http://www.envirosim.com/includes/weftec08.htm, downloaded Dec. 16, 2012.

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, pp. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

Tozer, "Study of Five Phosphorus Removal Processes," The Georgia Operator, vol. 45, No. (Winter 2008).

www.ingentaconnect.com/content/wef/wefproc/2009/00002009/00000004/art0020, downloaded Dec. 16, 2012.

Renjun, Xiong, Chinese Doctoral Dissertations & Master's Theses Full-text Database (Master) Engineering Science and Technology I, pp. B027-173, Sep. 15, 2004 (English Abstract, 2 pages).

Liao, Ting, "Second Office Action", Chinese Patent Application No. 202080077424.1, mailed Mar. 4, 2024, 14 pages.

Rozanska, Agnieszka, "Extended European Search Report", International patent application No. 20884180.9, mailed Jun. 26, 2023, 7 pages.

Brahmi, Khaled et al,"Treatment of heavy metal polluted industrial wastewater by a new water treatment process: ballasted electroflocculation", Journal Of Hazardous Materials, Elsevier, vol. 344, Nov. 27, 2017, pp. 968-980, XP085308371, ISSN: 0304-3894, DOI: 10.1016/J.JHAZMAT.2017.11.051.

Dias-Abey, Asoka, "Examination Report No. 1", Australian Patent Application No. 2020378058, mailed Aug. 18, 2025, 4 pages.

* cited by examiner

ACCELERATED SETTLEMENT OF FLOCS AFTER ELECTROCOAGULATION/ELECTROCHEMICAL PROCESS USING BALLASTED FLOCCULATION

RELATED APPLICATIONS

This application claims priority under 35 U.S.C. § 119(e) to U.S. Provisional Application Ser. No. 62/932,871, titled "ACCELERATED SETTLEMENT OF FLOCS AFTER ELECTROCOAGULATION/ELECTROCHEMICAL PROCESS USING BALLASTED FLOCCULATION," filed on Nov. 8, 2019 which is herein incorporated by reference in its entirety.

BACKGROUND

An electrocoagulation (EC) reactor is made up of an electrolytic cell with one anode and one cathode in its most basic form. When connected to an external power source, the anode material will electrochemically corrode due to oxidation, while the cathode will be subjected to passivation.

An EC system may include pairs of conductive metal plates in parallel, which act as monopolar electrodes. It may further include a direct current power source, a resistance box to regulate the current density and a multimeter to read the current values. The conductive metal plates are commonly known as "sacrificial electrodes." The sacrificial anode lowers the dissolution potential of the anode and minimizes the passivation of the cathode. The sacrificial anodes and cathodes can be of the same or of different materials.

The arrangement of monopolar electrodes with cells in series is electrically similar to a single cell with many electrodes and interconnections. In series cell arrangement, a higher potential difference is required for a given current to flow because the cells connected in series have higher resistance. The same current would, however, flow through all the electrodes. On the other hand, in parallel or bipolar arrangement the electric current is divided between all the electrodes in relation to the resistance of the individual cells, and each face on the electrode has a different polarity.

During electrolysis, the positive side undergoes anodic reactions, while on the negative side, cathodic reactions are encountered. Consumable metal plates, such as iron or aluminum, may be used as sacrificial electrodes to continuously produce ions in the water. The released ions neutralize the charges of the particles and thereby initiate coagulation. The released ions remove undesirable contaminants either by chemical reaction and precipitation, or by causing the colloidal materials to coalesce, which can then be removed by a variety of processes. In addition, as water containing colloidal particulates, oils, or other contaminants move through the applied electric field, there may be ionization, electrolysis, hydrolysis, and free-radical formation which can alter the physical and chemical properties of water and contaminants. As a result, the reactive and excited state causes contaminants to be released from the water and destroyed or made less soluble.

A ballasted flocculation process has typically involved adding a chemical to a liquid stream to induce solutes and particles to agglomerate. A ballast material is added to enhance the settling. The settled flocs are removed by means of a clarifier. The ballast material may comprise sand or a magnetic material, for example, magnetite. Magnetite has a greater density compared to sand which increases the settling rate. If magnetite is used as the ballast, a magnetic separation apparatus may be used. The ballast may be recovered and reused. This is accomplished by collecting the floc containing the magnetic seed and subjecting the flocs to a shearing apparatus. This separates the magnetic seed from the flocs. Re-circulating the magnetic seed may include secondary magnetic filtration of the magnetic seed from the flocs by applying a magnetic field to the flocs.

The magnetic seed collection means may include secondary magnetic filtration means. The secondary magnetic filtration means may include a secondary magnetic separator. The secondary magnetic separator may be a continuous high gradient magnetic separator, a cyclic high gradient magnetic separator, or a wet-drum type magnetic separator.

SUMMARY

In accordance with one aspect, there is provided a water treatment system. The water treatment system comprises a source of water including one or more contaminants selected from the group consisting of suspended solids, heavy metals, oxyanions, anions, or emulsified oils, an electrocoagulation cell including a housing defining a fluid flow conduit, an anode disposed within the fluid flow conduit, and a cathode disposed within the fluid flow conduit, the housing including an inlet fluidly connectable to the source of water and an outlet, a solids/liquid separation system having an inlet fluidly connectable to the outlet of the housing of the electrocoagulation cell, a solids-rich outlet, and a solids-lean outlet, and a ballast feed system configured to deliver a ballast to the solids/liquid separation system.

In some embodiments, the system further comprises one of an electrochemical separation device or a filter having an inlet fluidly connectable to the solids-lean outlet of the solids/liquid separation system and an outlet. The filter may include a media bed filter. The filter may include a membrane filter.

In some embodiments, the system further comprises a flow sensor and a water quality sensor fluidly connectable to one of the outlet of the one of the electrochemical separation device or the filter, the outlet of the solids/liquid separation system, or the outlet of the electrocoagulation cell.

In some embodiments, the system further comprises a controller in communication with the flow sensor and water quality sensor and configured to modulate one of flow of water through the electrocoagulation cell or current applied across the anode and cathode of the electrocoagulation cell based on a water quality measurement from the water quality sensor.

In some embodiments, the water quality sensor is one of a conductivity sensor, a turbidity sensor, or an oxidation-reduction potential sensor.

In some embodiments, the system further comprises a ballast recovery system configured to receive a ballasted floc from the solids-rich outlet of the solids/liquid separation system. The ballast recovery system may be further configured to separate unballasted floc from ballast in the ballasted floc, and to provide recovered ballast to the solids/liquid separation system.

In some embodiments, the electrocoagulation cell, solids/liquid separation system, ballast feed system, and ballast recovery system are disposed within a single system housing.

In some embodiments, the ballast feed system includes a ballast impregnation system fluidly connectable between the outlet of the housing of the electrocoagulation cell and the inlet of the solids/liquid separation system. The ballast impregnation system may be configured to incorporate the ballast into flocs to form ballasted flocs, and provide the ballasted flocs to the inlet of the solids/liquid separation system.

In some embodiments, the ballast comprises at least one of a magnetic material and sand.

In some embodiments, the magnetic material has a median particle size of less than 100 μm and a density of at least 5 g/cm3.

In accordance with another aspect, there is provided a method of treating water. The method comprises introducing water including one or more contaminants selected from the group consisting of suspended solids, heavy metals, or emulsified oils into an electrocoagulation cell including a housing defining a fluid flow conduit, an anode disposed within the fluid flow conduit, and a cathode disposed within the fluid flow conduit, applying current across the anode and cathode of the electrocoagulation cell and through the water in the electrocoagulation cell to form flocs including the one or more contaminants, directing an aqueous solution includ- ing the flocs from an outlet of the electrocoagulation cell into an inlet of a solids/liquid separation system having a solids-rich outlet and a solids-lean outlet, introducing a ballast into the aqueous solution to form ballasted flocs from the flocs, and separating the ballasted flocs from the aqueous solution to form a solids-lean fluid in a solids/liquid separation system.

In some embodiments, the method further comprises directing the solids-lean fluid from a solids-lean outlet of the solids/liquid separation system through one of an electro-chemical separation device or a filter.

In some embodiments, the method further comprises monitoring flow rate and one more parameters of water undergoing treatment with a water quality sensor in fluid communication with one of an outlet of the one of the electrochemical separation device or filter, the solids-lean outlet of the solids/liquid separation system, or the outlet of the electrocoagulation cell.

In some embodiments, the method further comprises modulating one of the flow rate or the current applied across the anode and cathode of the electrocoagulation cell based on a water quality measurement from the water quality sensor.

In some embodiments, the method further comprises directing the ballasted flocs from a solids-rich outlet of the solids/liquid separation system into a ballast recovery system, separating unballasted flocs from ballast in the bal-lasted flocs, and providing recovered ballast as a source of ballast that is delivered to the solids/liquid separation system.

In some embodiments, separating unballasted flocs from ballast in the ballasted flocs includes directing the ballasted flocs through a magnetic separation apparatus of the ballast recovery system.

In some embodiments, delivering ballast to the solids/ liquid separation system includes delivering the ballast to a ballast impregnation system in fluid communication between the outlet of the electrocoagulation cell and the inlet of the solids/liquid separation system.

In some embodiments, the water is directed through the electrocoagulation cell in a continuous flow.

The method may be performed without addition of a coagulant to the aqueous solution. The method may be performed without addition of a pH adjustment agent to the aqueous solution.

In accordance with another aspect, there is provided a method of retrofitting a water treatment system including an electrocoagulation cell and a solid-liquid separation unit in fluid communication downstream of the electrocoagulation cell. The method comprises providing a ballast feed system and providing instructions to operate the ballast feed system deliver a ballast to the solids/liquid separation unit.

In some embodiments, the method further comprises providing a ballast recovery system, providing instructions to deliver a ballasted floc from an outlet of the solids/liquid separation unit to the ballast recovery system, providing instructions to operate the ballast recovery system to sepa-rate unballasted floc from ballast in the ballasted floc, and providing instructions to direct recovered ballast from the ballast recovery system to the solids/liquid separation unit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every com-ponent may be labeled in every drawing. In the drawings.

DETAILED DESCRIPTION

Figure 1A:
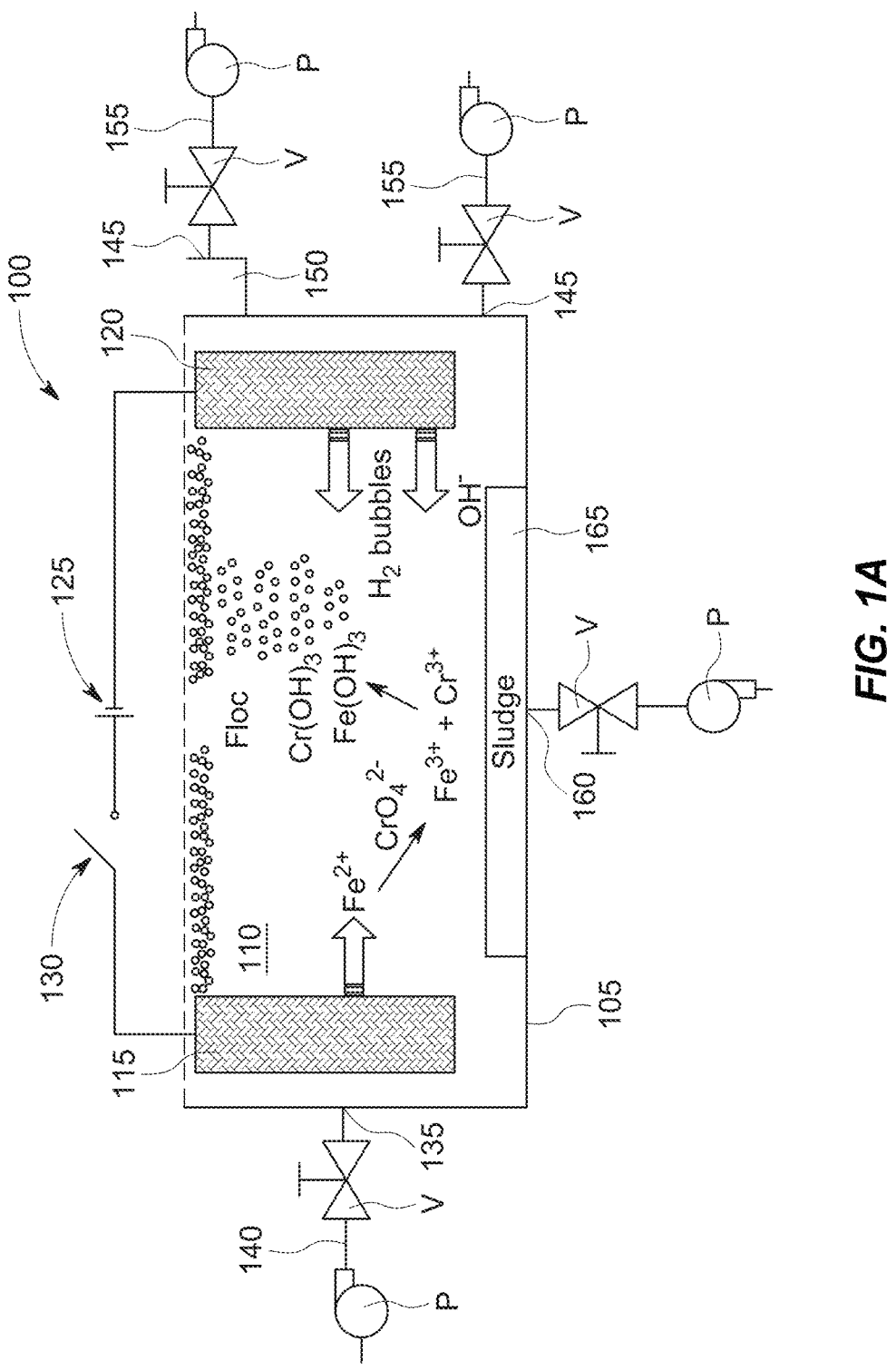
FIG. 1A illustrates an example of an electrocoagulation cell.

Aspects and embodiments disclosed herein are not limited to the details of construction and the arrangement of com-ponents set forth in the following description or illustrated in the drawings. Aspects and embodiments disclosed herein are capable of other embodiments and of being practiced or of being carried out in various ways.

Aspects and embodiments disclosed herein include enhanced systems and process for treatment of liquids by electrocoagulation (EC) or electrochemical treatment to remove one or more undesirable species from the liquid. The systems and processes disclosed herein may be applicable to the treatment of liquids to remove one or more contaminants including, for example, suspended solids, heavy metals, oxyanions or anions such as chromate and fluoride, or emulsified oils. The systems and processes disclosed herein may be applicable to the treatment of aqueous solutions or waste streams, for example, oil and gas produced water, mine process water, construction storm water, industrial stormwater, or industrial wastewater.

The systems and processes disclosed herein may enhance EC or electrochemical treatment of contaminated water by accelerating a rate by which flocs generated in the EC or electrochemical treatment may settle in a solids/liquid separation system to facilitate removal of the flocs from a solids-lean component of an aqueous solution after treatment in an EC or electrochemical treatment apparatus.

In accordance with various aspects and embodiments, a ballasted flocculation technique may be integrated into the post-EC or electrochemical treatment of contaminated water to accelerate floc settling. Several benefits may be possibly gained including, for example, a solids/liquid separation apparatus (e.g., a clarifier) with a smaller footprint may be utilized to obtain an equivalent solids/liquid separation rate or efficiency as a larger solids/liquid separation apparatus in an equivalent system not utilizing the ballasted flocculation technique. The increased settling rate of ballasted floc as compared to unballasted floc may reduce the amount of pH adjustment or even eliminate a need for pH adjustment of the electrochemically treated liquid to achieve a desired solids/liquid separation rate or efficiency. The increased settling rate of ballasted floc as compared to unballasted floc may also reduce or eliminate the need for polymer addition to the electrochemically treated liquid to facilitate flocculation and settlement and achieve a desired solids/liquid separation rate or efficiency. Further, effluent water quality is likely to be improved. The overall cost of the EC system operation would be reduced by introducing ballasted flocculation technique/system because costs associated with solids/liquid separation or clarification processes are directly associated with the speed of floc settlement.

Aspects and embodiments disclosed herein include apparatus and methods for accelerating the floc settling post-EC or electrochemical treatment of contaminated liquids or wastewater using ballasted flocculation. Prior known systems of treating contaminated liquids or wastewater with EC technology typically utilized the addition of polymer with pH adjustment in liquids after EC treatment to cause the flocs formed during EC process to settle in a settling vessel downstream of an EC treatment unit.

Ballasted flocculation systems and methods disclosed herein may include the incorporation of fine particles of a dense media into the flocculation process to accelerate the settling of flocs. The media may have a median particle size of less than 100 μm and a density of at least 5 g/cm³. Some examples of a ballasted flocculation system disclosed herein may utilize magnetite—fully inert iron ore particles—as a ballast material added to EC-treated liquid to settle chemical floc up to 30 times faster than conventional treatments. Aspects and embodiments of EC treatment systems and methods enhanced with ballasted floc settling processes as disclosed herein can be more effective with a solids/liquid separation unit, for example, a clarifier, of much smaller footprint and an effluent of higher quality, e.g., lower turbidity (<1 NTU) and color, improved oil and grease removal and improved heavy metal removal. In some embodiments acid/base usage for pH adjustment, and/or flocculant usage may be reduced or even eliminated, upon implementation of the ballasted settling systems and methods disclosed herein to achieve comparable clarification results as in conventional clarification systems and methods.

Aspects and embodiments disclosed herein include implementing a ballasted flocculation into the post-EC sludge/flocs removal process. In some embodiments, magnetite may be utilized as ballast material. Due to the high density (about 5.2 g/cm³) and hydrophobic characteristics of magnetite, it tends to diffuse into the chemical flocs and settle rapidly when it is introduced to the post EC-treated liquid. These magnetite particles are highly recoverable and reusable (up to 99%) which further helps keep operational costs low. With the substantial acceleration of settling of flocs, the footprint of a clarifier utilized in the systems disclosed herein may be much smaller with better effluent quality (e.g., lower turbidity and/or heavy metal concentration). In addition, because of the effectiveness of the ballasted flocculation process, the pH adjustment and polymer addition of conventional flocculation processes might be relaxed while still achieving desired effluent quality.

Electrocoagulation systems as disclosed herein may include one or more electrocoagulation cells each including a housing defining a fluid flow conduit, an anode disposed within the fluid flow conduit, and a cathode disposed within the fluid flow conduit. The housing may include an inlet fluidly connectable to a source of liquid, for example, contaminated water to be treated, and an outlet. The anode may be made of, for example, aluminum, iron, zinc or any other suitable metal. The cathode may be made of steel, stainless steel, titanium, or any other suitable material.

During operation, contaminated liquid (e.g., contaminated water) to be treated flows through the fluid flow conduit of an electrocoagulation cell. The fluid flow may be continuous although batch processing systems may also or alternatively be utilized. As the liquid to be treated flows through the fluid flow conduit of an electrocoagulation cell, a positive voltage is applied to the anode and a negative voltage is applied to the cathode. At the anode, the anode material is oxidized and releases metal cations into the liquid flowing through the fluid flow conduit. At the cathode, water splitting occurs and hydroxide ions ($OH^-$) are released into the liquid flowing through the fluid flow conduit. Hydrogen produced by the water splitting reactions at the cathode may form bubbles which help to separate solids (e.g., flocs) from liquids in the fluid flow conduit by attaching to solids and floating them upward through the fluid flow conduit. Additionally, electrons may flow from the cathode to the anode through the liquid and disrupt surface charges on contaminants present in the liquid. In the liquid in the fluid flow conduit, the metal cations from the anode may combine with the hydroxide ions from the cathode to form metal hydroxides that in turn form flocs in the liquid. The hydroxide ions from the cathode may also combine with dissolved metals in the liquid in the fluid flow conduit and form other metal hydroxide flocs. Other contaminants, for example, suspended solids, heavy metals, oxyanions, anions, or emulsified oils may be attracted to and be absorbed or entrained into or otherwise bind to the flocs, increasing the size of the flocs and reducing the contaminant content of the remainder of the liquid passing through the fluid flow conduit. This process may be enhanced due to the disruption of surface charges on these contaminants due to the electrons flowing through the liquid. Charged particles in the liquid may be neutralized by interaction with the metal cations or hydroxide ions and precipitate, forming a sludge in the electrocoagulation cell.

One example of an electrocoagulation cell is illustrated in FIG. 1A indicated generally at 100. The electrocoagulation cell 100 includes a housing 105 defining an interior fluid flow conduit 110. Within the housing 105 and fluid flow conduit 110 are disposed an anode 115 and a cathode 120 that are selectively electrically connected to a power source 125, for example, via a switch 130. In the example electrocoagulation cell 100 of FIG. 1A, the anode 115 is formed of iron. The cathode 120 may be formed of stainless steel, titanium, or any other suitable metal or conductive material. The housing 105 of the electrocoagulation cell 100 includes an inlet 135 for introducing liquid to be treated into the fluid flow conduit 110. A conduit 140 may provide the liquid to be treated to the inlet 135 and may include one or more pumps P or valves V to control a flow rate of liquid into the inlet 135. The housing 105 of the electrocoagulation cell 100 includes one or more outlets 145 for removing treated liquid (a solution of solids lean liquid and flocs) from the fluid flow conduit 110. The one or more outlets 145 may be disposed at an upper portion of the housing 105 to capture floating floc and solids-lean liquid, at lower portion of the housing to capture settled floc and solids-lean liquid, or both. In some embodiments, a weir 150 may provided at an upper end of the vessel 105 in fluid communication with an outlet 145 to capture floating floc and solids-lean liquid that overflows from the upper end of the vessel 105. The one or more outlets 145 may be coupled to one or more outlet conduits 155 that may include one or more pumps P or valves V to control a rate of withdrawal of treated liquid from the fluid flow conduit 110. The housing 105 may further include one or more sludge outlets 160 and associated valves V and pumps P that may be used to remove settled sludge 165 from within the fluid flow conduit 110.

An electrocoagulation cell 100 as illustrated in FIG. 1A may be utilized to remove chromate ($CrO_4^{2-}$) from liquid to be treated. In the electrocoagulation cell 100 illustrated in FIG. 1A the anode is iron. Iron cations from the anode and chromium cations dissociated from the chromate my bond to the hydroxide ions to form chromium hydroxide and iron hydroxide flocs that may aggregate with each other and/or other contaminants in the liquid in the fluid flow conduit 110. The flocs may float upwards through the fluid flow conduit 110 aided by hydrogen bubbles created at the cathode that may attach to the flocs for removal from the electrocoagulation cell 100.

Figure 1B:
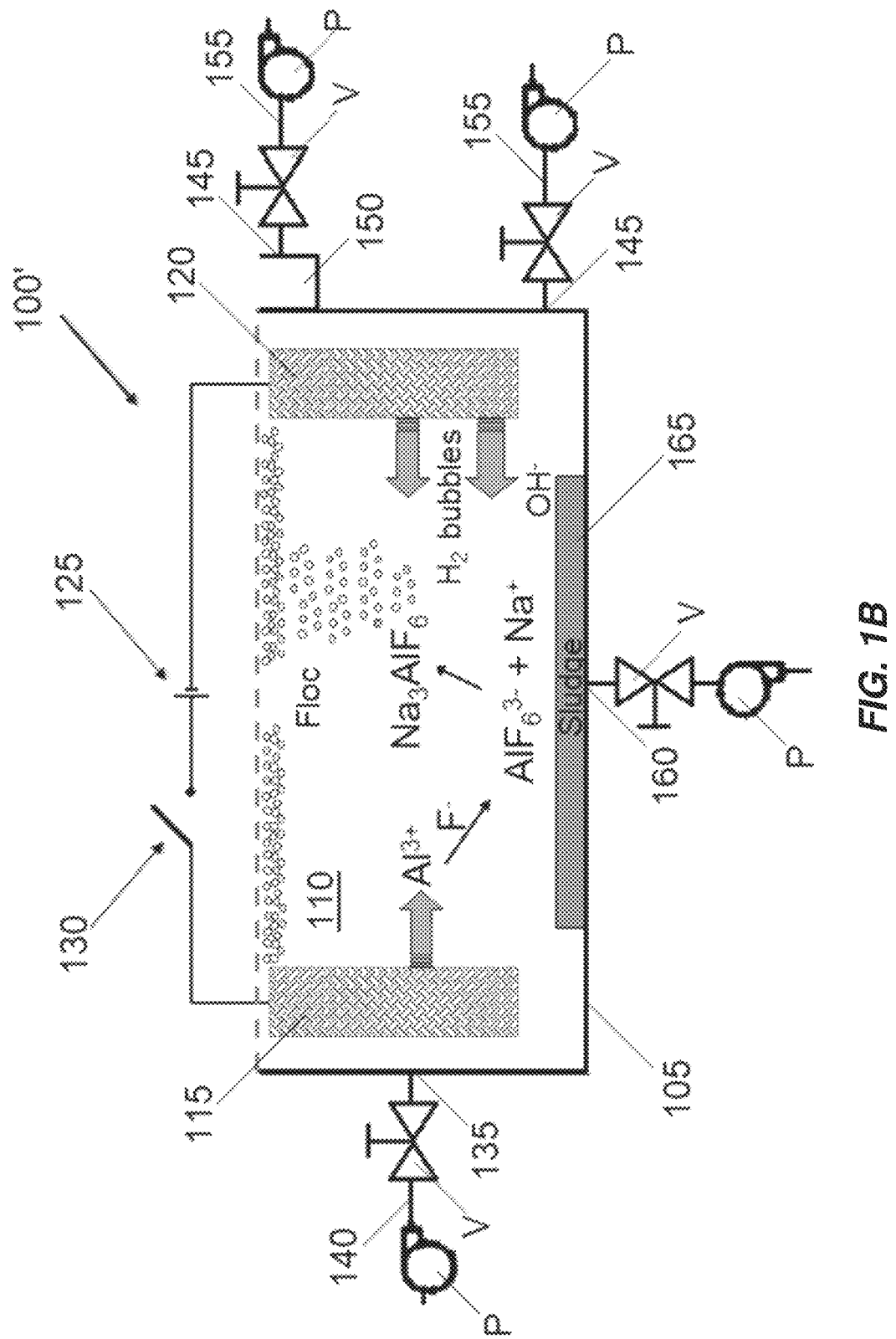
FIG. 1B illustrates another example of an electrocoagu-lation cell.

Another example of an electrocoagulation cell 100' as illustrated in FIG. 1B is substantially the same as the electrocoagulation cell 100 illustrated in FIG. 1A, except the anode is formed of aluminum. The electrocoagulation cell 100' illustrated in FIG. 1B may be utilized to remove fluoride from liquid to be treated. Aluminum cations from the anode may react with fluoride ions and sodium ions in in the liquid in the fluid flow conduit 110 to form sodium aluminum hexafluoride ($Na_3AlF_6$) that may settle out of solution as a portion of the sludge generated in the electrocoagulation cell. Aluminum hydroxide formed from combination of the aluminum cations from the anode and hydroxide ions from the cathode may also form flocs that may aggregate with each other and/or other contaminants in the liquid in the fluid flow conduit 110. Instead of settling, some or all of the sodium aluminum hexafluoride may be entrained in the flocs. The flocs may float upwards through the fluid flow conduit 110 aided by hydrogen bubbles created at the cathode that may attach to the flocs for removal from the electrocoagulation cell 100'.

Figure 2:
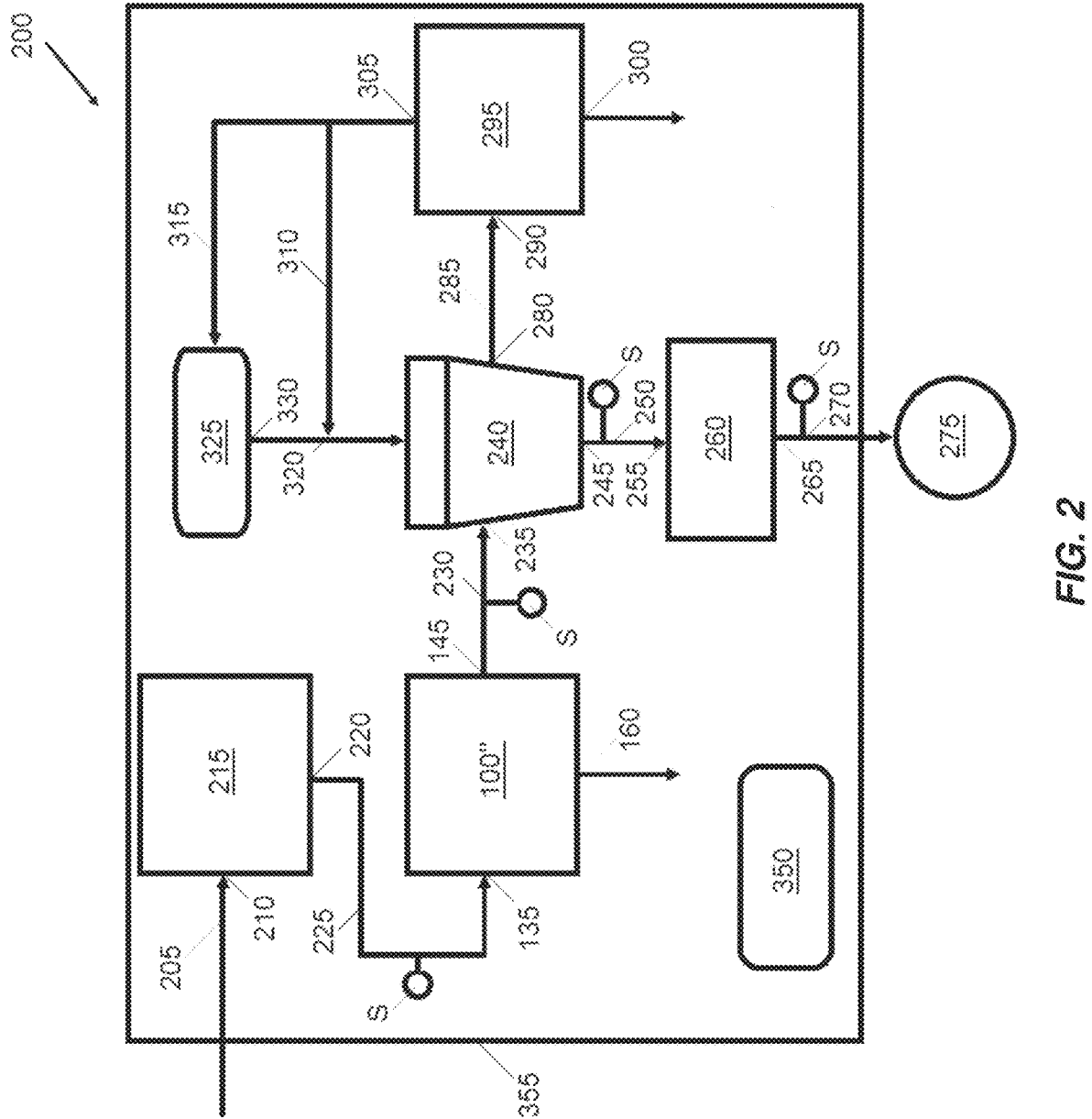
FIG. 2 is a block diagram of an example of a water treatment system in accordance with one embodiment.

An example of a water treatment system in accordance with the present disclosure in illustrated generally in at 200 in block diagram in FIG. 2. FIG. 2 is a simplified block diagram that, for the sake of clarity, omits many features of the system such as pumps, valves, control lines, sampling ports, etc., that may be present in actual systems. Water to be treated may enter the system through a conduit 205. The conduit 205 may direct the water to be treated into an inlet 210 of an optional pre-filter 215. The pre-filter 215 may be a screen filter, a sand filter, or any other form of pre-filter known in the art. The pre-filter 215 may remove particulate matter from the water to be treated that might otherwise damage downstream operations.

The water to be treated exits an outlet 220 of the pre-filter 215 (if utilized) and passes through conduit 225 to an inlet

135 of and electrocoagulation unit 100" that may be similar to or that may include multiple electrocoagulation cells 100, 100' as described above. The water to be treated is treated by electrocoagulation in the electrocoagulation unit 100" to produce an aqueous solution including flocs including one or more contaminants from the water to be treated. The aqueous solution exits the electrocoagulation unit 100" from a one or more outlets, illustrated collectively as outlet 145. Sludge produced in the electrocoagulation unit 100" may be periodically or continuously removed through sludge outlet 160.

The aqueous solution from the one or more outlets 145 of the electrocoagulation unit 100" passes through conduit 230 and into an inlet 235 of a solids/liquid separation unit 240, which in some embodiments is or includes a clarifier. Ballast material, for example, sand, magnetite, or other ballast material known in the art is supplied from a source of ballast or ballast feed system 325 through conduit 320 into the solids/liquid separation unit 240. The ballast attaches to or is otherwise incorporated into the flocs in the solids/liquid separation unit 240 to facilitate settling of the flocs to produce a solids-lean fluid or effluent and a solids-rich aqueous solution including the settled flocs.

The solids lean fluid or effluent exits the solids/liquid separation unit 240 through a solids-lean outlet 245. An optional polishing unit 260, for example, a filter (e.g., a sand filter, membrane filter, or reverse osmosis unit), ion exchange unit, electrochemical separation device (e.g., an electrodialysis or electrodeionization unit), or other polishing or solids/liquid separation unit known in the art may receive the solids-lean fluid or effluent directed from the solids-lean outlet 245 through conduit 250 into an inlet 255 of the polishing unit 260. Polished or further treated liquid may exit the polishing unit 260 through an outlet 265 and conduit 270 and be directed to a point of use 275 as potable water, irrigation water, boiler water, drinking water, etc., or may be released to the environment.

The settled ballasted flocs or an aqueous solution including the settled ballasted flocs exits the solids/liquid separation unit 240 through a solids-rich outlet 280 and is directed through a conduit 290 to a ballast recovery unit 295, discussed in further detail below. The ballast recovery unit 295 separates ballast from the ballasted flocs. The separated ballast may exit the ballast recovery unit 295 through a ballast outlet 305 and may be recycled to the source of ballast 325 through conduit 315 or may be added directly back into the solids/liquid separation unit 240 through conduit 320. Floc material from which ballast was separated in the ballast recovery unit 295 may exit the ballast recovery unit 295 through floc outlet 300 and may be sent for disposal, further processing, or as return activated sludge to a unit operation in a biological wastewater treatment system.

The system 200 may include one or more sensors S disposed within or attached to various of the conduits of the system, for example, conduits in fluid communication with any one or more of an outlet of the polishing unit 260, the solids-lean outlet of the solids/liquid separation system 240, or the outlet of the electrocoagulation unit 100". The sensors S may be or include flow meters and/or one or more water quality sensors. Examples of water quality sensors that be utilized include, for example, conductivity sensors, turbidity sensors, oxidation-reduction potential sensors, or chemical species specific concentration sensors. The system 200 may further include a controller 350 in communication with the one or more sensors S. The controller 350 may be configured to modulate flow of water through the electrocoagulation unit and/or current applied across the anode and cathode of the electrocoagulation cell based on a water quality measurement from one or more of the sensors S. The controller 350 may be in communication with the one or more sensors S via wired communication links (not shown for sake of clarity) or via wireless communication links.

In some embodiments, one or more, or, in some embodiments, all or the functional units of the system, for example, the electrocoagulation unit 100", solids/liquid separation unit 240, ballast feed system 325, and ballast recovery unit 295 are disposed within a single system housing 355. The controller 350 may be included in the housing 355 with the other components or may be located remote from the other components of the system.

Figure 3:
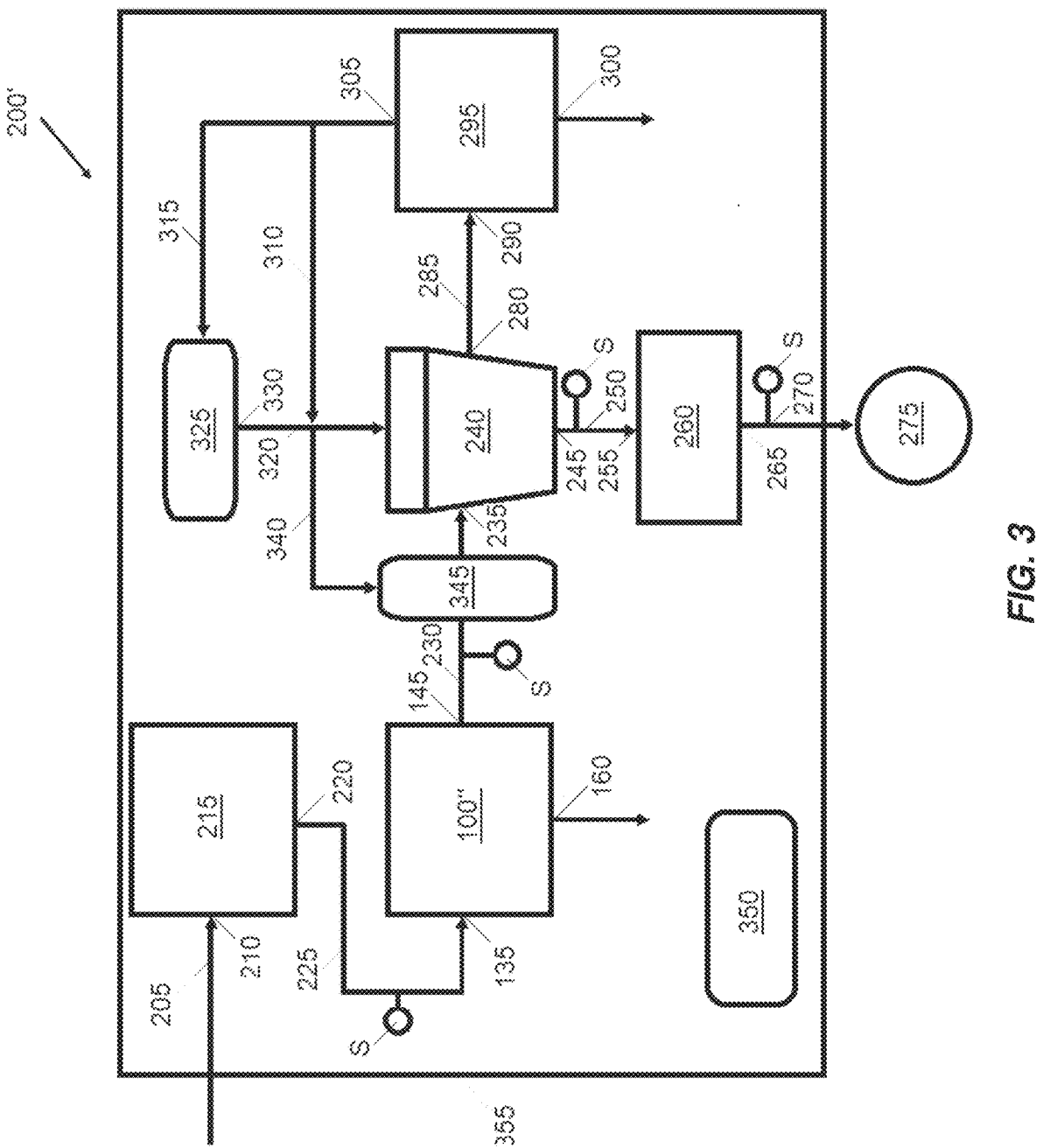
FIG. 3 is a block diagram of an example of a water treatment system in accordance with another embodiment.

In another embodiment, indicated generally at 200' in FIG. 3 a water treatment system in accordance with the present disclosure may be similar to that of system 200 but may further include a ballast impregnation system 345 fluidly connected or connectable between the outlet 145 of the electrocoagulation unit 100" and the inlet 235 of the solids/liquid separation unit 240. The ballast impregnation system 345 may, for example, be disposed inline in conduit 230. Additionally or alternatively to providing fresh or recycled ballast from the ballast feed system 325 and/or ballast recovery unit 295, respectively, directly to the solids/liquid separation unit 240, fresh or recycled ballast from the ballast feed system 325 and/or ballast recovery unit 295, respectively may be provided to ballast impregnation system 345 for entrainment of the ballast into flocs output from the electrocoagulation unit 100" prior to entry into the solids/liquid separation unit 240.

In some wastewater treatment systems as disclosed herein ballast material, for example, magnetite is added to one or more vessels or treatment units, for example, a solids/liquid separation unit, a ballast impregnation system upstream of the solids/liquid separation unit (e.g., a clarifier), or into an electrocoagulation cell to facilitate settling of suspended solids, for example, flocs generated in the electrocoagulation cell in the solids/liquid separation unit. A portion of the added magnetite may become trapped in foam or other floating waste material in one or more of these treatment vessels. In some instances, it may be economically beneficial to recover the magnetite from an aqueous solution, ballasted floc, and/or waste materials that are removed from the solids/liquid separation unit. Thus, in some embodiments, an outlet of the solids/liquid separation unit may be in fluid communication with an inlet of a ballast recovery system. For example, the solids-rich outlet of a solids/liquid separation unit may direct collected liquid and/or ballasted floc to an inlet of a magnetite recovery system.

Figure 4:
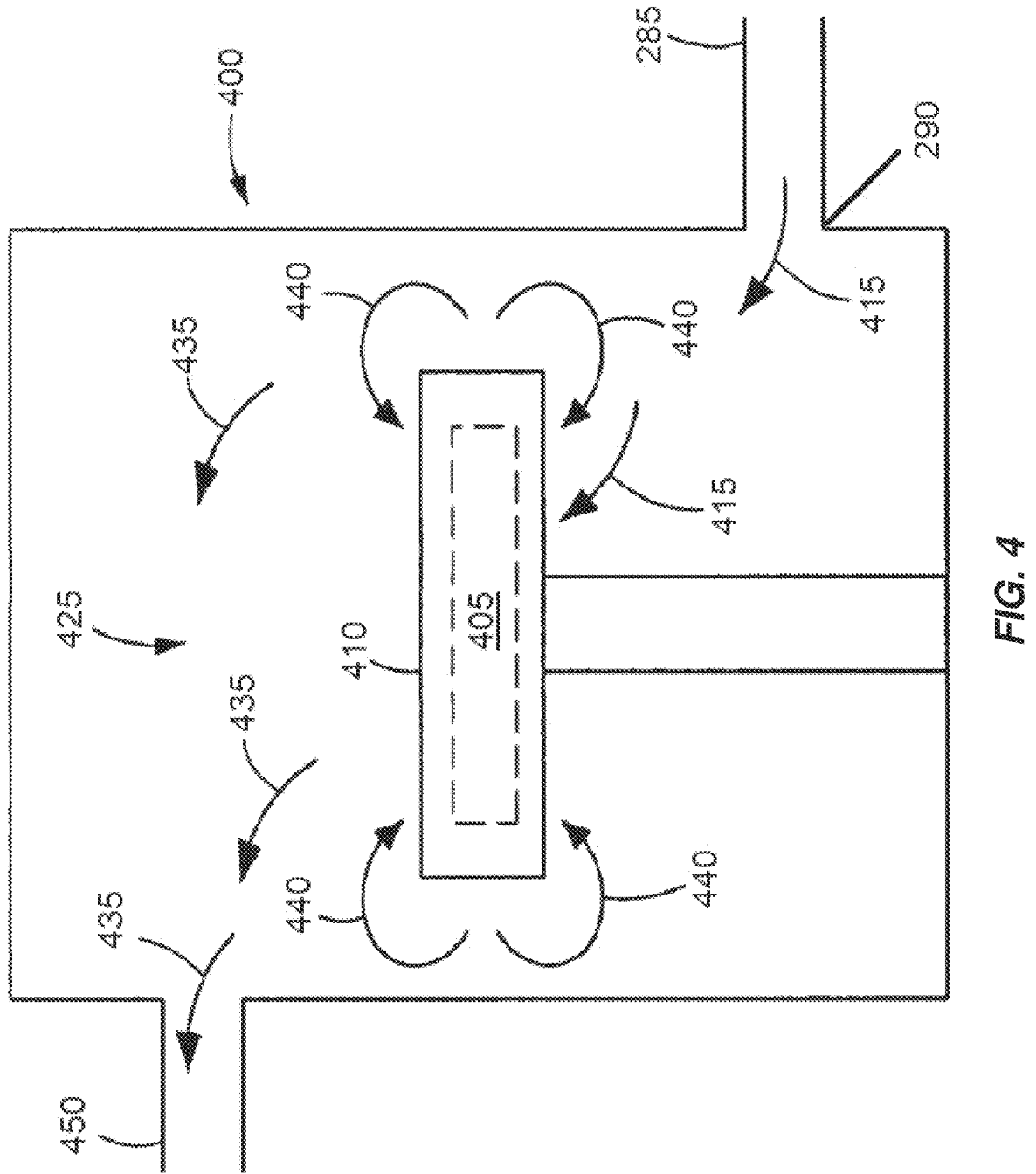
FIG. 4 is a schematic diagram of a shear mill included in a ballast recovery system in accordance with an embodiment of the present disclosure.

A ballast recovery system as disclosed herein may include two major components, a first separator to physically break up ballasted floc, and a magnetic ballast recovery unit or separator. With reference to FIGS. 2-4, Ballasted floc, or an aqueous solution including ballasted floc and, optionally, other waste materials exits the solids-rich outlet 280 of the solids/liquid separation unit 240 and passes through conduit 285 into the inlet 290 of a first separator 400. The first separator 400 performs an initial separation of magnetite particles from waste materials, for example, ballasted floc, using, for example, mechanical forces.

The first separator 400 may include any known apparatus for separating ballast from waste solids, for example, ballasted floc. In one example, the separator is configured as a shear mill as illustrated generally at 400 in FIG. 4. The shear mill 400 shears the waste materials/ballasted floc from the conduit 285 to separate the ballast from other solids or floc in introduced into the shear mill 400. The shear mill 400 may includes a rotor 405 and stator 410. In operation, the ballasted floc from the conduit 285 enter the shear mill 400 and flows in the direction of arrows 415 and enter the rotor 405 and then the stator 410. The shear mill 400 is designed such that there is a close tolerance between the rotor 405 and the stator 410. The rotor 405 is in some embodiments driven at high rotational speeds, for example, greater than about 1,000 rpm to form a mixture of ballast and substantially ballast-free obliterated flocs in area 425 of the shear mill 400. The mixture of ballast and obliterated flocs exits the shear mill 400 through conduit 450, as shown by arrows 435.

In some embodiments the rotor 405 and/or stator 410 include slots which function as a centrifugal pump to draw the floc from above and below rotor 405 and stator 410, as shown by paths 440 in FIG. 4. The rotor and stator then hurl the materials off the slot tips at a very high speed to break the ballasted floc into a mixture of ballast and obliterated flocs. For example, the rotor 405 may include slots, and the stator 410 may include slots. The slots in the rotor 405 and/or the slots in the stator 410 may be designed to increase shear energy to efficiently separate the ballast from the ballasted flocs. The shear developed by the rotor 405 and stator 410 may depend on the width of the slots in the rotor and/or stator, the tolerance between the rotor 405 and stator 410, and the rotor tip speed. The result is that the shear mill 400 provides a shearing effect which effectively and efficiently separates the ballast from the ballasted floc to facilitate recovery of the ballast.

In other embodiments, the separator 400 may be configured as an ultrasonic separator or a centripetal separator. Aspects and embodiments disclosed herein are not limited to any particular form of separator for separating ballast from waste solids.

Figure 5A:
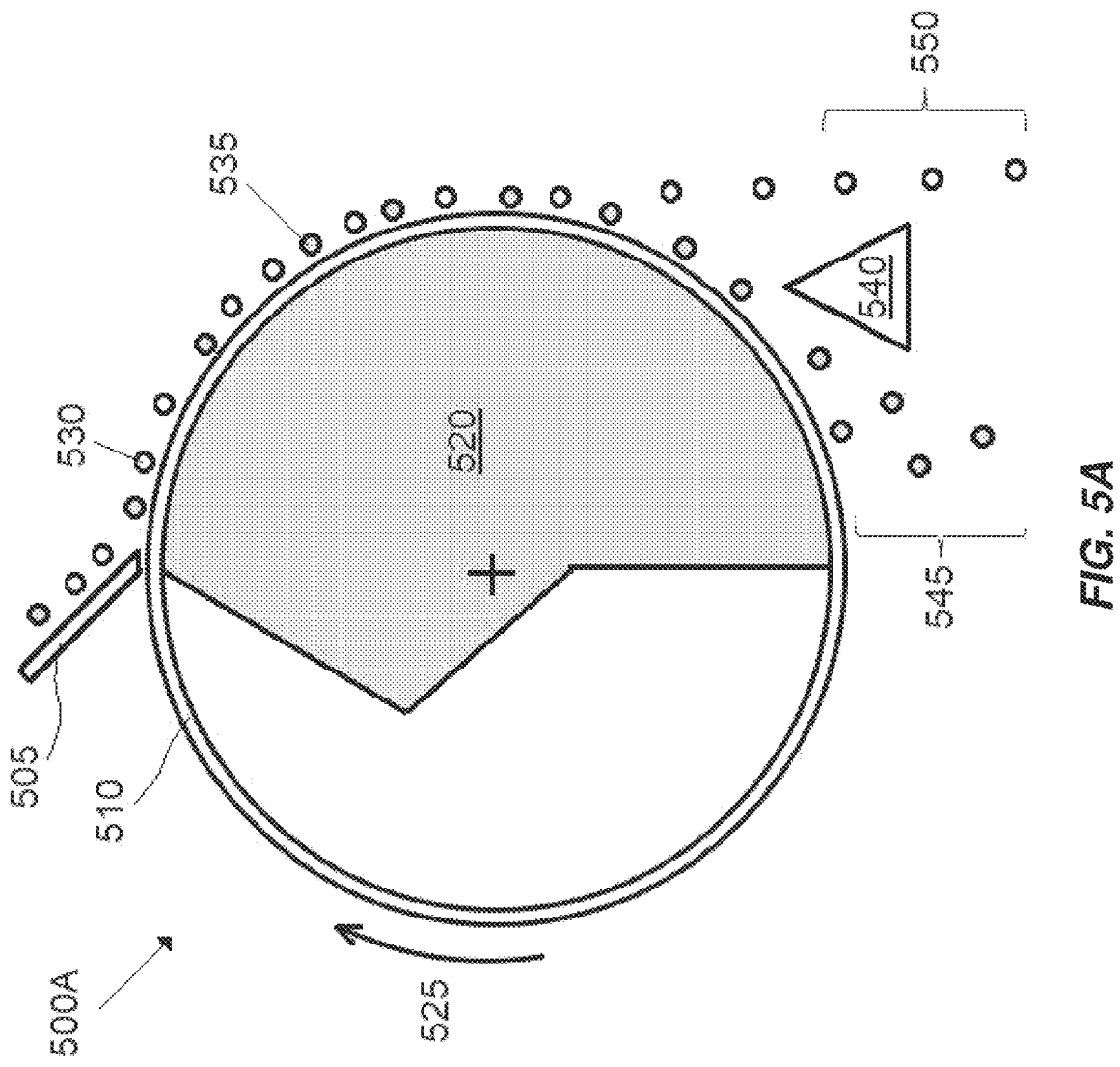
FIG. 5A is a schematic diagram of a magnetic separator included in a ballast recovery system in accordance with an embodiment of the present disclosure.

In some embodiments, the mixture of ballast and sheared flocs exit the shear mill 400 through a conduit 450 and enter a magnetic drum separator, indicated generally at 500A in FIG. 5A. The magnetic drum separator 500A includes a drum 510 in which is disposed a magnet 520. The drum rotates in the direction of arrow 525, clockwise in this example. A mixture of ballast 535, represented by the colored circles in FIG. 5A, and obliterated flocs 530, represented by the empty circles in FIG. 5A, are introduced to the surface of the rotating drum 510 through a conduit or feed ramp 505. The ballast, when comprised of a magnetic material, for example, magnetite, adheres more strongly to the drum 510 than the obliterated flocs of waste material due to the presence of the magnet 520. The obliterated flocs fall off of the drum, in some examples aided by centripetal force generated by the rotating drum, before the ballast. A division vane 540 may separate the ballast 535 and obliterated flocs 530 into two separate output streams 545, and 550, respectively.

Figure 5B:
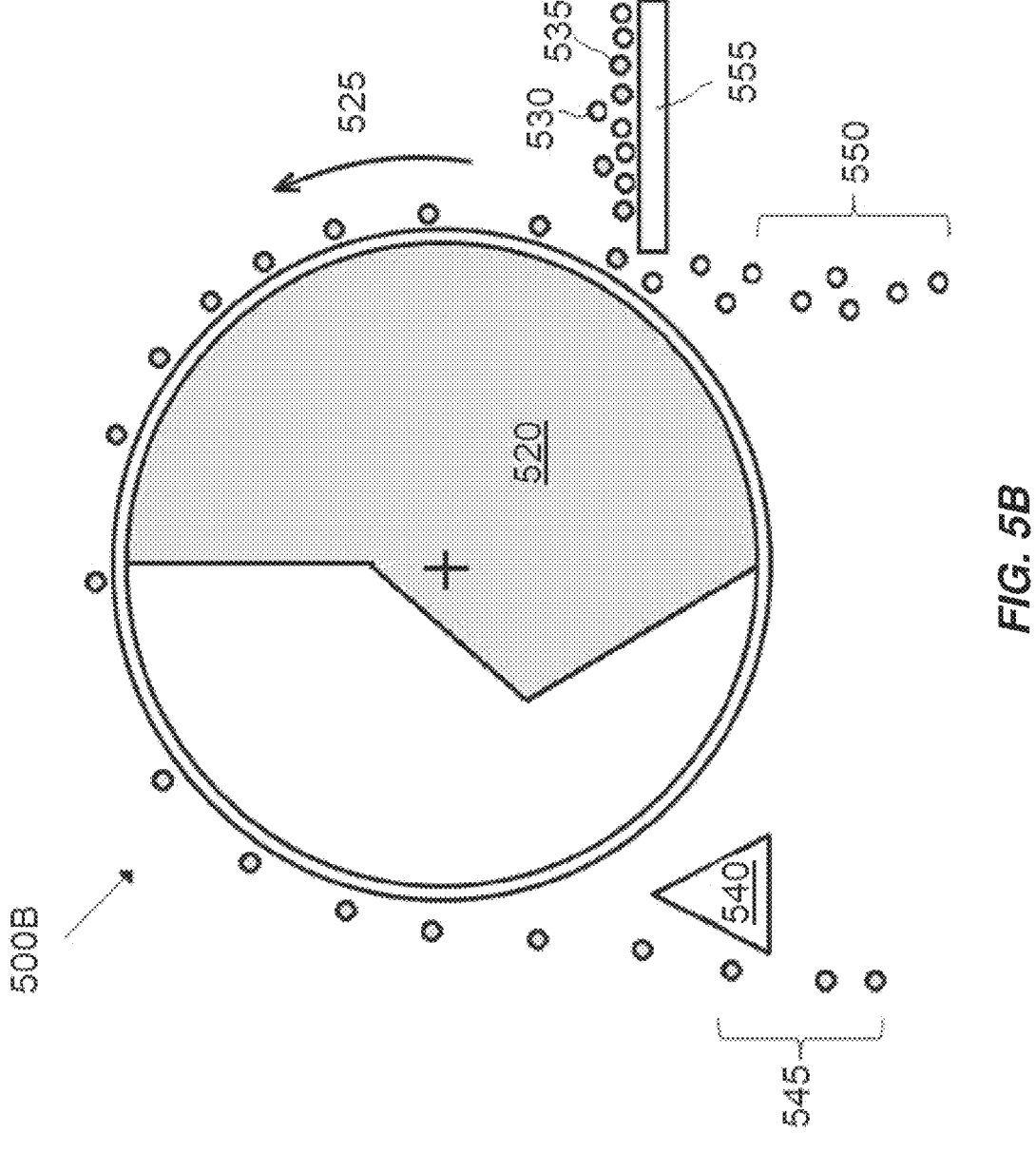
FIG. 5B is a schematic diagram of a magnetic separator included in a ballast recovery system in accordance with another embodiment of the present disclosure.

In another embodiment of the magnetic separator, indicated generally at 500B in FIG. 5B, the mixture of ballast and obliterated flocs is introduced by a conduit or feed ramp 555 to a position proximate and to the side of the rotating drum 510. The ballast, when comprised of a magnetic material, for example, magnetite, adheres to the rotating drum 510 due to the presence of the magnet 520 and may be removed from the rotating drum on the opposite side from the conduit or feed ramp 555 by, for example, a scraper or division vane 540. The obliterated flocs do not adhere to the rotating drum 510 and instead drop from the end of the conduit or feed ramp 555. The result is the production of separate streams 545 and 550 of the ballast 535 and obliterated flocs 530.

The ballast separated in the magnetic separator may be introduced to conduit 310 and/or 315 (FIGS. 2 and 3) and recycled or reintroduced into one or more treatment units of the wastewater treatment system. The obliterated flocs may be passed out of the outlet 300 of the ballast recovery system 295 and sent on for further downstream processing or disposal.

In another embodiment the mixture of ballast and flocs are introduced directly to the magnetic separator, without passing through a mechanical separation device. In other embodiments, materials collected from the solids-rich outlet 280 of the solids/liquid separator 240 are not directed into a ballast recovery system, but rather are sent directly to a disposal system.

A controller used for monitoring and controlling operation of the various elements of systems disclosed herein, for example, controller 350 illustrated in FIGS. 2 and 3, may include a computerized control system. Various aspects of the controller may be implemented as specialized software executing in a general-purpose computer system 600 such as that shown in FIG. 6. The computer system 600 may include a processor 602 connected to one or more memory devices 604, such as a disk drive, solid state memory, or other device for storing data. Memory 604 is typically used for storing programs and data during operation of the computer system 600. Components of computer system 600 may be coupled by an interconnection mechanism 606, which may include one or more busses (e.g., between components that are integrated within a same machine) and/or a network (e.g., between components that reside on separate discrete machines). The interconnection mechanism 606 enables communications (e.g., data, instructions) to be exchanged between system components of system 600. Computer system 600 also includes one or more input devices 608, for example, a keyboard, mouse, trackball, microphone, touch screen, and one or more output devices 610, for example, a printing device, display screen, and/or speaker.

The output devices 610 may also comprise valves, pumps, or switches which may be utilized to control operating parameters of the electrocoagulation unit 100", for example current across the anode 115 and cathode 120 and/or to control the speed of pumps P or the state (open or closed) of valves V of systems as disclosed herein. One or more sensors 614 may also provide input to the computer system 600. These sensors may include, for example, any one or more of sensors S discussed above which may be, for example, water quality sensors and/or flow rate sensors. These sensors may be located in any portion of the system where they would be useful, for example, upstream of point of use 275, upstream or downstream of electrocoagulation unit 100", or upstream or downstream of the solids/liquid separator 240. In addition, computer system 600 may contain one or more interfaces (not shown) that connect computer system 600 to a communication network in addition or as an alternative to the interconnection mechanism 606.

Figure 7:
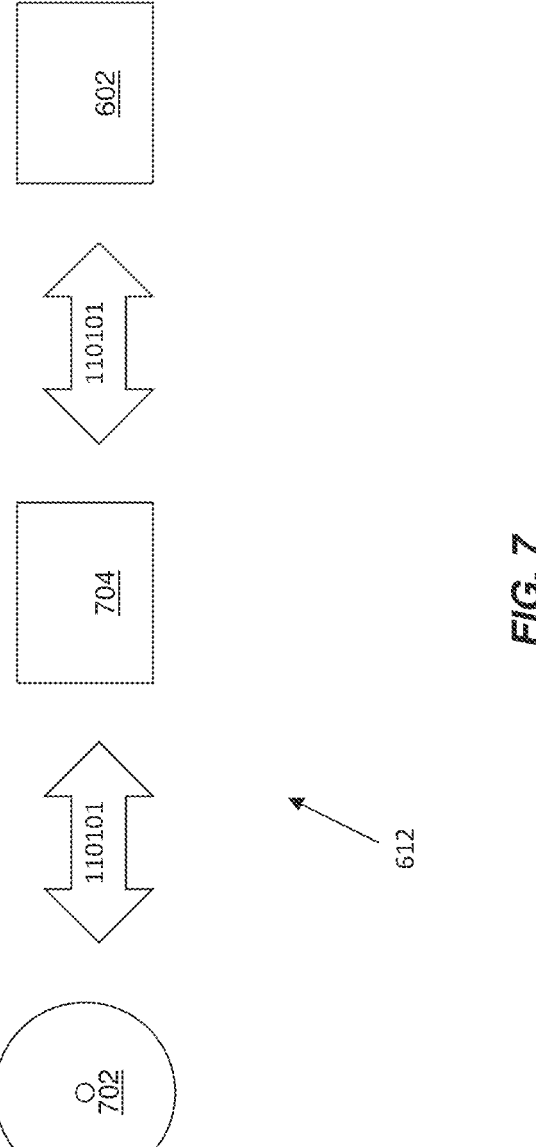
FIG. 7 illustrates a memory system for the control system of FIG. 6.

The storage system 612, shown in greater detail in FIG. 7, typically includes a computer readable and writeable nonvolatile recording medium 702 in which signals are stored that define a program to be executed by the processor 602 or information to be processed by the program. The medium may include, for example, a disk or flash memory. Typically, in operation, the processor causes data to be read from the nonvolatile recording medium 702 into another memory 704 that allows for faster access to the information by the processor than does the medium 702. This memory 704 is typically a volatile, random access memory such as a dynamic random access memory (DRAM) or static memory (SRAM). It may be located in storage system 612, as shown, or in memory system 604. The processor 602 generally manipulates the data within the integrated circuit memory 704 and then copies the data to the medium 702 after processing is completed. A variety of mechanisms are known for managing data movement between the medium 702 and the integrated circuit memory element 704, and aspects and embodiments disclosed herein are not limited thereto. Aspects and embodiments disclosed herein are not limited to a particular memory system 604 or storage system 612.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 6:
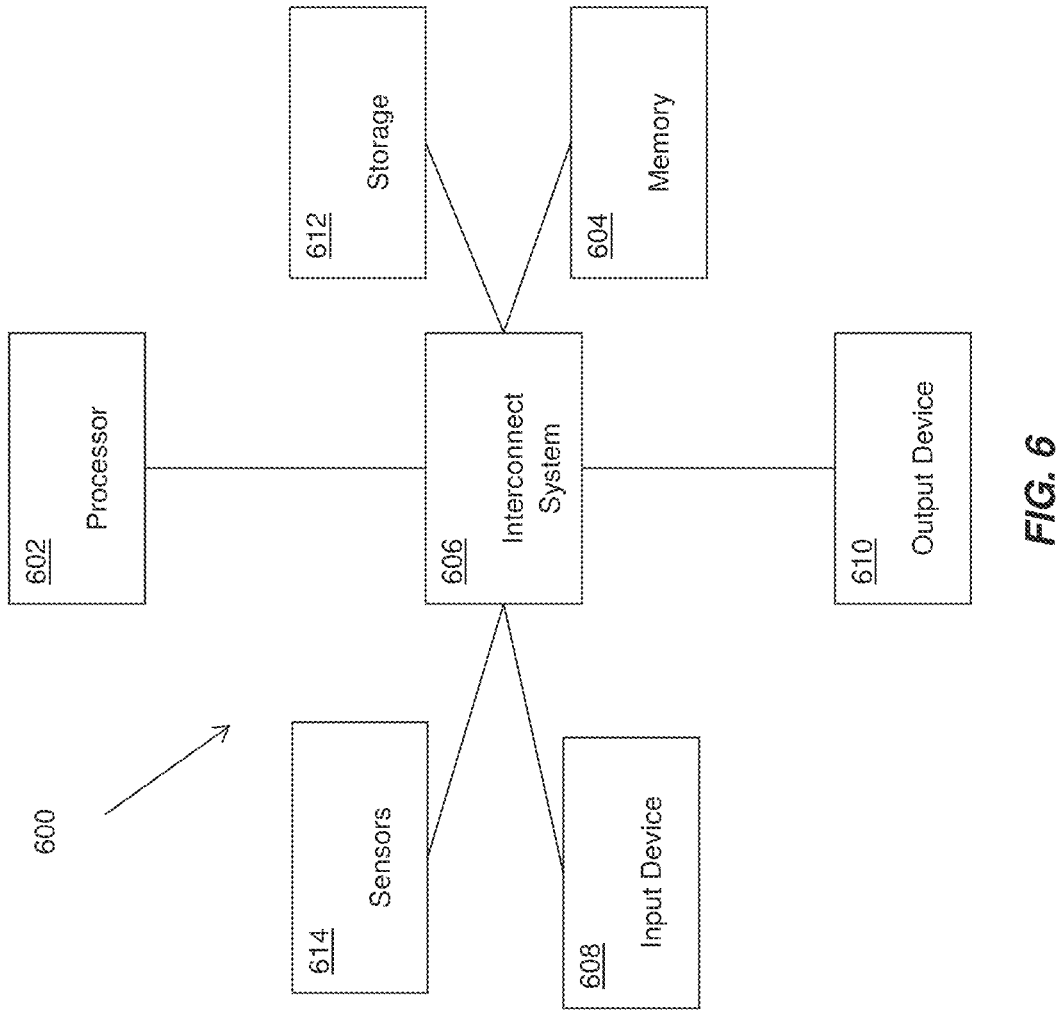
FIG. 6 illustrates a control system that may be utilized for embodiments of water treatment systems disclosed herein.

Although computer system 600 is shown by way of example as one type of computer system upon which various aspects and embodiments disclosed herein may be practiced, it should be appreciated that aspects and embodiments disclosed herein are not limited to being implemented on the computer system as shown in FIG. 6. Various aspects and embodiments disclosed herein may be practiced on one or more computers having a different architecture or components than shown in FIG. 6.

Computer system 600 may be a general-purpose computer system that is programmable using a high-level computer programming language. Computer system 600 may be also implemented using specially programmed, special purpose hardware. In computer system 600, processor 602 is typically a commercially available processor such as the well-known Core' class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that aspects and embodiments disclosed herein are not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 600 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C # (C-Sharp). Other object-oriented programming languages may also be used. Alternatively, functional, scripting, and/or logical programming languages may be used, for example, ladder logic. Various aspects and embodiments disclosed herein may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

In some embodiments, an existing electrocoagulation system may be modified or upgraded to include elements of the systems disclosed herein or to operate in accordance with the systems disclosed herein. A method of retrofitting an electrocoagulation system increase the rate of settling of flocs generated in the electrocoagulation system may include installing a ballast system configured to introduce ballast into a solids/liquid separation unit of the electrocoagulation system. A ballast recovery unit system may further be added to the existing system. Instructions may be provided to an operator of the existing system regarding how to connect the ballast system and/or ballast recovery system and how to operate same.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A water treatment system comprising:
   a source of water including one or more contaminants selected from the group consisting of suspended solids, heavy metals, oxyanions, anions, or emulsified oils;
   an electrocoagulation cell including a housing defining a fluid flow conduit, an anode disposed within the fluid flow conduit, and a cathode disposed within the fluid flow conduit, the housing including an inlet fluidly connectable to the source of water and an upper outlet disposed at an upper portion of the housing and configured to capture floc and solids-lean liquid from within the fluid flow conduit, a lower outlet disposed at a lower portion of the housing and configured to capture settled floc and solids-lean liquid from within the fluid flow conduit, and one or more sludge outlets configured to remove settled sludge from within the fluid flow conduit;
   a solids/liquid separation system having an inlet fluidly connectable to the upper outlet and to the lower outlet of the housing of the electrocoagulation cell, a solids-rich outlet, and a solids-lean outlet; and
   a ballast feed system configured to deliver a ballast to the solids/liquid separation system.

2. The system of claim 1, further comprising one of an electrochemical separation device or a filter having an inlet fluidly connectable to the solids-lean outlet of the solids/liquid separation system and an outlet.

3. The system of claim 2, wherein the filter includes a media bed filter.

4. The system of claim 2, wherein the filter includes a membrane filter.

5. The system of claim 2, further comprising a flow sensor and a water quality sensor fluidly connectable to one of the outlet of the one of the electrochemical separation device or the filter, the solids-lean outlet of the solids/liquid separation system, or one of the upper outlet and the lower outlet of the electrocoagulation cell.

6. The system of claim 5, further comprising a controller in communication with the flow sensor and water quality sensor and configured to modulate one of flow of water through the electrocoagulation cell or current applied across the anode and cathode of the electrocoagulation cell based on a water quality measurement from the water quality sensor.

7. The system of claim 6, wherein the water quality sensor is one of a conductivity sensor, a turbidity sensor, or an oxidation-reduction potential sensor.

8. The system of claim 1, further comprising a ballast recovery system configured to receive a ballasted floc from the solids-rich outlet of the solids/liquid separation system, the ballast recovery system including a mechanical separator and a magnetic ballast recovery unit.

9. The system of claim 8, wherein the ballast recovery system is further configured to separate unballasted floc from ballast in the ballasted floc, and to provide recovered ballast to the solids/liquid separation system.

10. The system of claim 8, wherein the electrocoagulation cell, solids/liquid separation system, ballast feed system, and ballast recovery system are disposed within a single system housing.

11. The system of claim 1, wherein the ballast feed system includes a ballast impregnation system fluidly connectable between the outlet of the housing of the electrocoagulation cell and the inlet of the solids/liquid separation system.

12. The system of claim 11, wherein the ballast impregnation system is configured to incorporate the ballast into flocs to form ballasted flocs, and provide the ballasted flocs to the inlet of the solids/liquid separation system.

13. The system of claim 1, wherein the ballast comprises at least one of a magnetic material and sand.

14. The system of claim 13, wherein the magnetic material has a median particle size of less than 100 μm and a density of at least 5 g/cm3.

15. The system of claim 9, wherein the solids/liquid separation system comprises a clarifier and the ballast recovery system is configured to deliver recovered ballast directly into the clarifier.

16. The system of claim 8, wherein the ballast recovery system includes fresh ballast, and the ballast recovery system includes a ballast outlet fluidly connectable to the ballast feed system and configured to recycle recovered ballast to the ballast feed system.

17. The system of claim 16, wherein the ballast outlet is further directly fluidly connectable to the solids/liquid separation system.

18. The system of claim 8, wherein the ballast recovery system further comprises a floc outlet configured to discharge floc material from which ballast was separated, and to direct the floc material to one of disposal, further processing, or as return activated sludge.

19. The system of claim 1, wherein the electrocoagulation cell further includes a weir disposed at an upper end of the housing and in fluid communication with the upper outlet, the weir configured to capture floating floc and solids-lean liquid that overflows from the upper end of the housing.

* * * * *